Dec. 24, 1957 E. V. WEIR 2,817,807

MAGNETIC AMPLIFIER CIRCUIT USING COMPLEX FEEDBACK

Filed Aug. 11, 1950 3 Sheets-Sheet 1

Inventor

EDGAR V. WEIR

By G. W. O'Brien

R. M. Hicks

Attorneys

Dec. 24, 1957 E. V. WEIR 2,817,807

MAGNETIC AMPLIFIER CIRCUIT USING COMPLEX FEEDBACK

Filed Aug. 11, 1950 3 Sheets-Sheet 2

Inventor

EDGAR V. WEIR

By G. D. O'Brien

R. M. Hicks

Attorneys

Inventor
EDGAR V. WEIR
By R. D. O'Brien
R. M. Hicks
Attorneys

United States Patent Office 2,817,807

Patented Dec. 24, 1957

2,817,807

MAGNETIC AMPLIFIER CIRCUIT USING COMPLEX FEEDBACK

Edgar V. Weir, Arlington, Va.

Application August 11, 1950, Serial No. 178,946

15 Claims. (Cl. 323—89)

(Granted under Title 35, U. S. Code (1952), sec. 266)

This invention relates to magnetic amplifier circuits wherein a combination of feedback effects, one of which is a derivative feedback effect is utilized, in order to obtain a higher speed of response of the amplifier for the same amplification factor and stability than that obtainable in prior circuits.

In order that magnetic amplifiers may be satisfactorily applied to the control of servo-mechanisms and other high speed of response apparatus the delay in response must be at a minimum while maintaining the required power gain and stability.

Heretofore the speed of response of a magnetic amplifier in response to changes in the input signal was increased by the employment of time rate circuits which would boost the positive feedback during transient periods. This boost of the positive feedback was accomplished through either a capacitive coupling of additional feedback windings to some portion of the circuit where a D. C. voltage which was proportional to the load current appeared, or a capactive by-passing of resistance in the feedback circuit to give a corresponding transient boost.

All systems using the transient boost of positive feedback principle depend upon the flow of extra current in an inductive circuit as a change in the output current occurs. Those systems are inherently stable in their characteristics and, for their effect, depend upon the build up of an additional current, or magnetizing ampere turns, which can only occur as a result of some response of the relatively slow stable circuit. This feature has proven to be a disadvantage in high speed of response applications because all lags are working against the establishment of an unstable overbalance of positive feedback which is what is required for the higher speed of response.

In the absence of negative feedback, the circuit of the present invention is designed to be inherently unstable having a jump response characteristic.

A jump response characteristic is a substantially instantaneous change of output current from one value to another. This current is prohibited, in my invention, from changing in an uncontrollable manner to extreme values by the application of a delayed negative feedback current which stabilizes the circuit to the desired power gain. The negative feedback current, which is applied to an inductive circuit, is delayed further in some cases by being passed through an additional inductance. For example, if the inductance of the negative feedback circuit itself is sufficient to provide the necessary delay no additional inductance is needed. Hence, the aforementioned disadvantage in relation to the establishment of an unstable overbalance of positive feedback is obviated. The negative feedback current is derived from some source of D. C. potential which is proportional to the load current, just as the transient boosting positive feedback has been derived in earlier systems.

Accordingly, an object of this invention is the provision of a new and improved magnetic amplifier circuit wherein a high speed of response is attained without sacrifice of stability or power amplification.

Another object resides in the provision of an inherently unstable magnetic amplifier having jump response characteristics controllable by derivative feedback effects.

A further object is to provide a magnetic amplifier which utilizes positive feedback to produce jump response characteristics and time delayed negative feedback for providing stability of response.

Another object is to provide a magnetic amplifier circuit which, when connected to a mechanism such, for example, as a servo-mechanism, will control such a mechanism with a greater efficiency than has been previously attained.

Other objects and many of the attendant advantages of this invention will be readily appreciated as the same becomes better understood by reference to the following detailed description when considered in connection with the accompanying drawings wherein.

Figure 1:
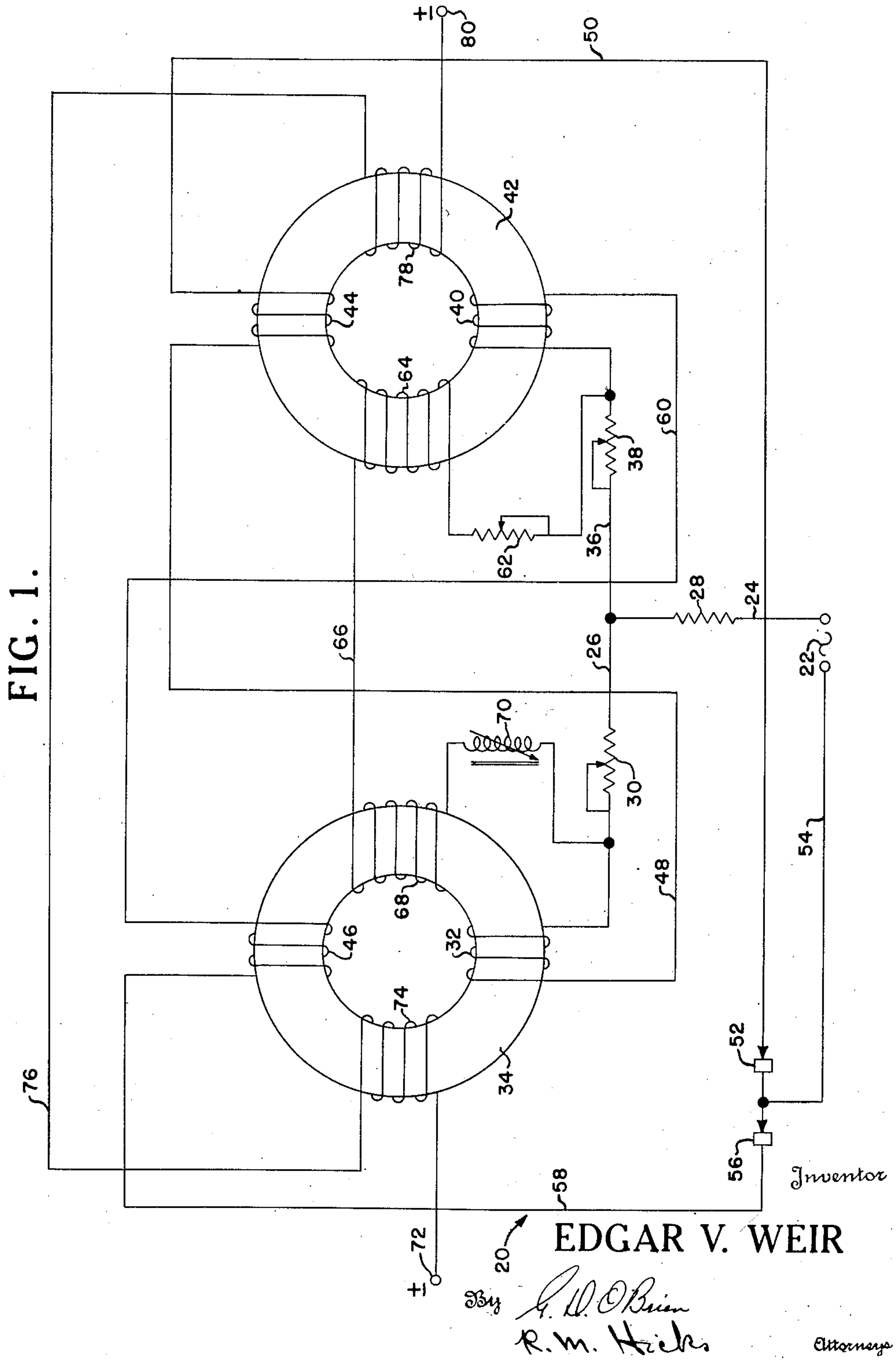
Fig. 1 is a schematic illustration of a self saturating magnetic amplifier circuit in accordance with a preferred embodiment of the invention.

Referring now to the accompanying drawings in which like reference numerals are employed to designate like parts, and more particularly to Fig. 1 thereof, in which reference numeral 20 generally designates a magnetic amplifier circuit according to a preferred embodiment of this invention. A source of alternating current is denoted by numeral 22. Leads 24 and 26 having a load resistance 28 and a small dropping resistance 30, respectively, therein are connected so as to provide a current path between source 22 and power winding 32 which is wound upon a magnetic core such, for example, as toroid 34. Lead 36 having a small adjustable dropping resistance 38 therein is similarly connected between power winding 40, which is wound upon a magnetic core 42, and lead 24. The power windings 32 and 40 are respectively connected to positive feedback boosting windings 44 and 46 through leads 48 and 60, respectively. Positive feedback boosting winding 44 is connected to source 22 by lead 50, rectifier 52, and lead 54, and the positive feedback boosting winding 46 is connected to source 22 by lead 58, rectifier 56, and lead 54.

The negative feedback circuit is comprised of windings 64 and 68 interconnected by lead 66 and which are connected across the dropping resistances 30 and 38 by an inductance 70 and variable resistance 62. This inductance may be either a dust core representing a linear inductance or, in some cases, an inductance of the non-linear type, an example of which is a core of Ni-Fe alloy having rectangular hysteresis loop characteristics.

The control circuit is comprised of a terminal 72 on one end of a control winding 74 and adapted to be connected to a source of D. C. current such, for example, as a potentiometer energized by a gyro-mechanism. Control winding 74 is connected to another control winding 78 having a terminal 80 by lead 76.

During operation of the magnetic amplifier illustrated in Fig. 1 the alternating current supplied to the circuit at the source 22 follows one path through the circuit during one half of the A. C. cycle and follows another path through the circuit during the other half of the cycle. During that half of the A. C. cycle in which the wave of the A. C. voltage is positive the current will enter the circuit at one of the two leads connected to the terminals at the source 22 such, for example, as lead 24. The current then flows through load resistance 28, lead 26, small dropping resistance 30, power winding 32, lead 48, positive feedback boosting winding 44, conductor 50, rectifier 52, and lead 54 back to the source 22. Only a very small current will pass through lead 36 on this half of the cycle because of the presence of resistances 38 and 62 in one possible path and because of rectifier 56 in the other possible path. In the other half cycle of the alternating current the current will enter the other lead at the source 22 such, for example, as lead 54, and will then pass through rectifier 56, conductor 58, positive feedback boosting winding 46, conductor 60, power winding 40, and then in two paths through the remainder of the circuit as hereinafter described. One of the two paths comprises resistance 62 which is large relative to the resistances 30 and 38, negative feedback winding 64, lead 66, negative feedback winding 68, inductance 70, resistance 30, conductor 26, resistance 28, and lead 24 back to source 22. The other of the aforementioned two paths comprises the small resistance 38, lead 36, resistance 28, and lead 24 back to source 22. It will be understood by those skilled in the art that resistors 30, 38, and 62 are suitably adjusted so that current flow through the aforementioned paths substantially in the manner as aforetraced. The windings 44 and 46 and the power windings 32 and 40 comprise a parallel connected self saturating magnetic amplifier circuit incorporating a boosting of the positive feedback. The positive or regenerative feedback boosting windings 44 and 46 are utilized to boost the inherent positive feedback effect of the self saturating circuit thereby rendering the response characteristics of the amplifier inherently unstable. The small dropping resistances 30 and 38, respectively, are positioned within the legs of this parallel circuit to provide a source of D. C. voltage for the negative feedback circuit, hereinabove described, and which D. C. voltage is proportional to the load current. The mechanism to be controlled such, for example, as a servo-mechanism is represented by load resistance 28.

The highest speed of response is attained through adjustment of the number of turns in the positive feedback boosting windings 44 and 46, the negative feedback windings 64 and 68, and the values of resistances 30, 38, 62 and inductance 70 so that an optimum combination is obtained for the highest speed of response while maintaining the stability of the circuit. Adjustment of these parameters controls the response characteristic of the amplifier, giving characteristics ranging from a jump response with overshoot to the slower response which is normally associated with magnetic amplifiers.

Because of the high degree of positive feedback which is employed in the circuit of Fig. 1, the number of turns in the control windings 74 and 78 is low. When such control current is applied as to give an increase in the output current as shown in Fig. 1, the initial effective feedback is at a high value which is actually above the limit for stability in the amplifier. This exists for a short time interval during which output current substantially instantaneously rises to a high value at a predetermined rate which is sufficient to allow the overbalance of positive feedback to exist and the jump response to take place. The negative feedback increases to its steady state value thereby counteracting the overbalance of positive feedback and adjusting the output current to its corresponding steady state value.

When the control is changed in a manner to reduce the output current, the positive feedback effect begins to drop off almost immediately at the beginning of any half-cycle, whereas the inductive negative feedback momentarily remains essentially at a high level to force the response in the desired direction, and then, at a predetermined rate, falls off to the stable, steady state operating condition.

Figure 2:
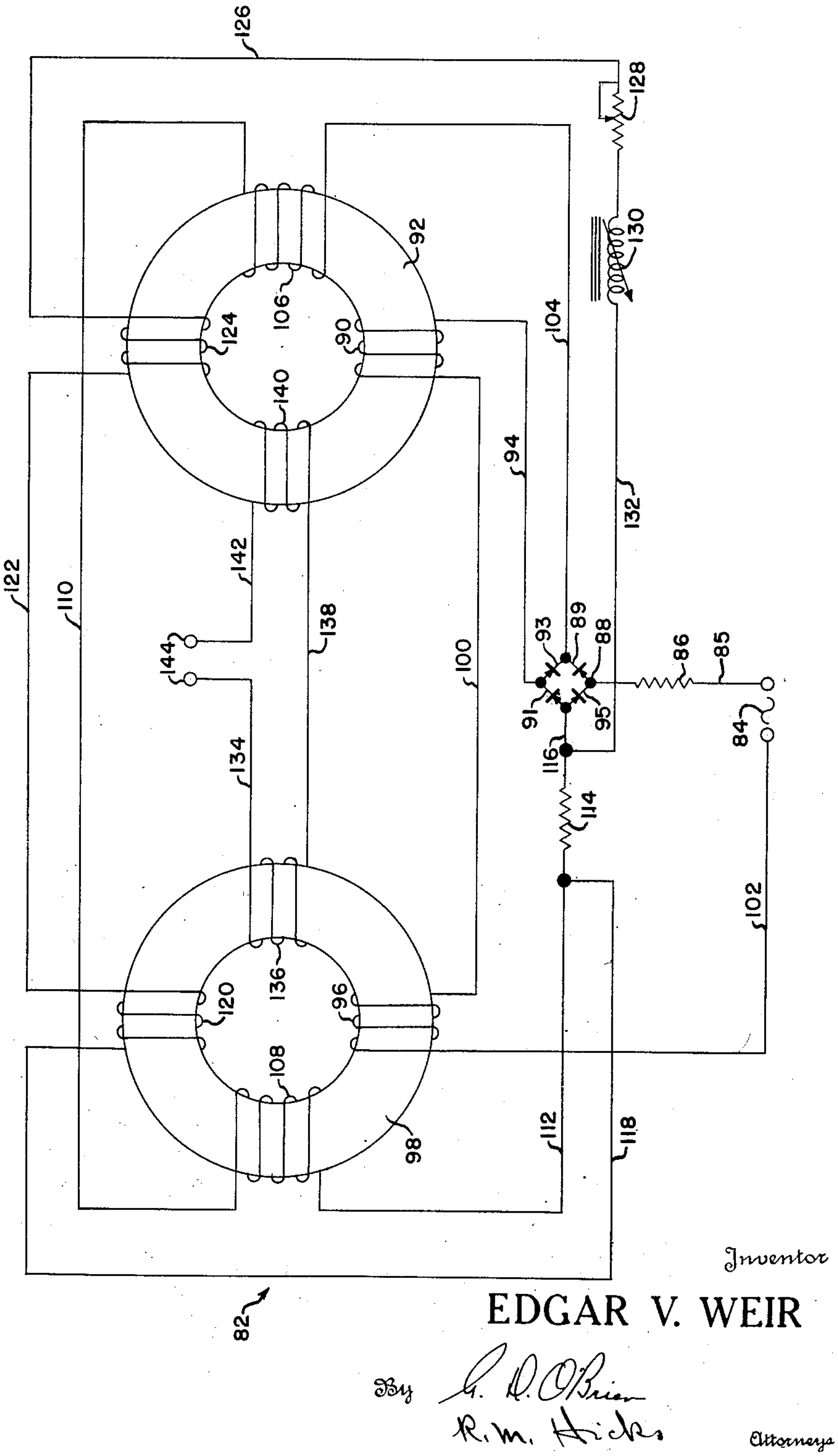
Fig. 2 is a schematic illustration of a series magnetic amplifier circuit in accordance with another form of the instant invention.

The principles of this invention may be applied to a variety of magnetic amplifier circuits one of which is illustrated as an alternative embodiment of the invention in Fig. 2 wherein numeral 82 generally indicates a series magnetic amplifier circuit with high feedback, 84 designates a source of A. C. current, and 86 denotes a load resistance connected in lead 85 and which connects the source of A. C. current to a full wave rectifier 88. The full wave rectifier is connected to a power winding 90, which is wound upon a magnetic core 92, by conductor 94. Another power winding 96 wound upon another magnetic core 98 is connected in series with the power winding 90 through lead 100. Conductor 102 connects power winding 96 to source 84.

In this form of the invention the positive feedback circuit is connected into the power circuit by means of the full-wave rectifier. Conductor 104 connects the full-wave rectifier 88 to a positive feedback winding 106 on the magnetic core 92. Another positive feedback winding 108 wound upon core 98 is connected to positive feedback winding 106 by lead 110. The positive feedback winding 108 is connected back to rectifier 88 by conductor 112, resistance 114, and conductor 116.

Tracing the negative feedback circuit in a clockwise direction around the embodiment shown in Fig. 2 it will be observed that this circuit comprises conductor 118, connected to lead 112, negative feedback winding 120 wound upon magnetic core 98, conductor 122, negative feedback winding 124 wound upon core 92, conductor 126, variable resistance 128, inductance 130, and conductor 132 which is connected to conductor 116.

The control circuit shown in Fig. 2 comprises conductor 134, control winding 136, conductor 138, control winding 140, and conductor 142.

The operation of the circuit shown in Fig. 2 will now be described. When an alternating voltage is applied at the A. C. source 84 the current will follow one path in the circuit of Fig. 2 during one half-cycle of this voltage and another during the other half-cycle, similarly as hereinbefore described with reference to the circuit of Fig. 1. It will arbitrarily be assumed that for the first half-cycle current will enter conductor 85 and then sequentially pass through the load resistance 86, one leg 89 of full-wave rectifier 88, lead 104 to positive feedback winding 106, conductor 110, positive feedback winding 108, conductor 112 to the resistance 114. The current splits into two courses at resistance 114 in this half-cycle, one course being through resistance 114, lead 116, one leg 91 of full-wave rectifier 88, lead 94, power winding 90, lead 100, power winding 96, lead 102, and out of the circuit at the other terminal of the A. C. source 84. The other course is through lead 118, negative feedback winding 120, lead 122, negative feedback winding 124, lead 126, variable resistance 128, inductance 130, lead 132, lead 116, one leg 91 of full-wave rectifier 88, lead 94, power winding 90, lead 100, power winding 96, and out of the circuit through lead 102.

On the next half-cycle of the A. C. supplied at source 84 the current will pass through the other terminal such, for example, as that shown at the source end of lead 102. Then the current will pass through lead 102, power winding 96, lead 100, power winding 90, lead 94, one leg 93 of full-wave rectifier 88, lead 104, positive feedback winding 106, lead 110, positive feedback winding 108, and lead 112. The current then splits into two courses similarly as in the first half-cycle, hereinabove described. In one course the current flows through lead 118, negative feedback winding 120, lead 122, negative feedback winding 124, lead 126, variable resistance 128, linear inductance 130, lead 132, lead 116, one leg 95 of rectifier 88, and out of the circuit through conductor 85 having load resistance 86 therein. The other portion of the current which follows the other course flows through resistance 114, conductor 116, one leg 95 of full-wave rectifier 88, and out of the circuit through resistance 86, and lead 85.

The control current which is D. C. may flow in either direction through the control circuit depending upon the type of control desired. For example, the control circuit may be connected and wound in the manner shown in Fig. 2 whereby the current of this circuit would flow from the source 144 through conductor 134, control winding 136, lead 138, control winding 140, and lead 142 back to source 144. If connected as shown in Fig. 2, control windings 136 and 140 impose a positive control upon the cores 92 and 98; i. e., windings 136 and 140 have the same effect as the positive feedback windings 106 and 108.

Figures 3, 4, 5:
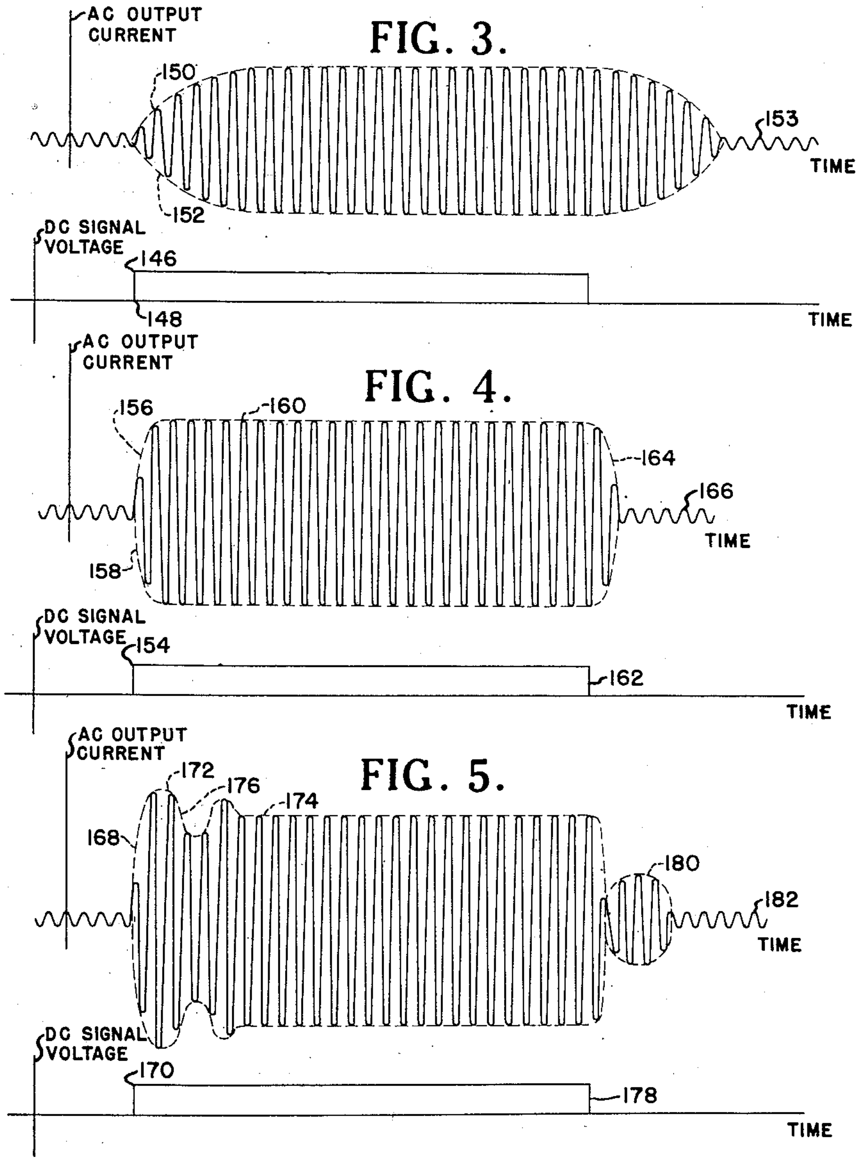
Fig. 3 is a graphical showing of the response characteristic of a conventional magnetic amplifier circuit utilizing no complex feedback of the instant invention.
Fig. 4 illustrates, in graphical form, the jump response characteristic of a magnetic amplifier utilizing the complex feedback circuit of either Fig. 1 or Fig. 2.
Fig. 5 is a graph similar to that of Fig. 4 but in which the jump response characteristic, inherently present in my invention, is shown to have an overshoot.

The graph shown in Fig. 3 is illustrative of the operating characteristics of a conventional magnetic amplifier in which no complex feedback of my invention is utilized. If a D. C. signal voltage 146 is applied at a predetermined time 148, the A. C. output current begins to change in a relatively gradual manner as shown at 150 and 152 to a predetermined value where this output current becomes substantially constant and remains so until the signal voltage is changed. At this time the A. C. output current again gradually changes until the final conditions 153 are attained.

Referring now to Fig. 4 which shows the results of the application of the principles involved in the instant invention it will be readily apparent that the speed of rise and fall is much greater in the circuit of my invention than that of a conventional magnetic amplifier. At any given time that a signal voltage 154 is applied to the control circuit the output current rapidly changes in a substantially instantaneous manner as shown at 156 and 158 until it becomes stabilized at a steady state value as shown at 160, for example. Upon removal of the signal voltage as shown by numeral 162, the output current very quickly assumes, as denoted at 164, its final state 166.

If either the system shown in Fig. 1 or in Fig. 2 is used and the elements are adjusted as hereinabove mentioned for extreme effects, the graph of Fig. 5 results wherein the output current again responds very quickly as, for example, at 168 upon the application of a signal voltage 170. However, in this situation, the response of output overshoots, as at 172, the steady state condition 174 and falls back in a damped oscillatory manner 176 to the steady state. When the signal voltage is withdrawn, as at 178, the output current again quickly responds, but, also, again overshoots the initial state and acquires the initial state by oscillating back and forth, as at 180, until the final state 182 thereof is reached.

Summarizing, the instant invention has the advantage over previous magnetic amplifier systems in that the high rates of response of an unstable system are inherently present and simultaneously are accompanied by entirely stable characteristics. The lags in current build-up or in current decay work to advantage in the present system, whereas, in prior systems, those lags were always working against the establishment of the transient overbalance of positive or negative feedback which is essential to the rapid overall rise or fall response of the amplifier. In certain systems which utilize a magnetic amplifier circuit in accordance with this invention the inductance of the negative feedback circuit might be sufficient in itself to provide the desired amount of inductance in the circuit. As hereinabove described, this invention primarily features the combination of an unstable positive feedback and a delayed stabilizing negative feedback to effect an improvement in the speed of response of a magnetic amplifier without sacrifice of stability or power gain.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is my intention, therefore, to cover in the appended claims all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. A magnetic amplifier circuit comprising a plurality of magnetic cores, a source of alternating current, rectifying means electrically connected to pass current directly from said source, a power winding, a positive feedback winding, and a negative feedback winding wound respectively upon each of said cores and electrically connected in said circuit to conduit current from said source passed by said rectifying means, an inductance and a resistance electrically connected to at least one of said negative feedback windings to provide a delay circuit for said negative feedback windings, a source of direct current signal, and a control winding on each of said cores electrically connected to said direct current source.

2. A magnetic amplifier having improved time of response characteristics comprising a source of alternating current having two terminals thereon, a load resistance electrically connected to one of said terminals of said source, a first voltage dropping resistance in electrical connection with said load resistance, a plurality of magnetic cores, a first power winding wound upon a first of said magnetic cores and directly electrically connected to said first dropping resistance, a first positive feedback winding wound upon a second of said magnetic cores and directly electrically connected to said first power winding on said first magnetic core, a first and a second rectifier electrically connected to the other of said terminals of said source, a second positive feedback winding wound upon said first magnetic core having one side thereof directly electrically connected to said second rectifier, and a second power winding upon said second magnetic core having one side thereof directly electrically connected to the other side of said second positive feedback winding, a resistance one side of which is electrically connected to the other side of said second power winding, a first negative feedback winding wound upon said second core and having one side thereof directly electrically connected to said last named resistance, a second negative feedback winding wound upon said first core and directly electrically connected to said first negative feedback winding, an inductance one side of which is electrically connected to said second negative feedback winding and the other side of which is electrically connected between said first dropping resistance and said first power winding, and a second voltage dropping resistance electrically connected at one end thereof to said second power winding and at the other end thereof between said load resistance and said first dropping resistance.

3. A magnetic amplifier having rapid response characteristics comprising source of alternating current, a plurality of magnetic core elements, a first electrical circuit all elements of which are electrically connected in series arrangement with one another and which comprises a load resistance electrically connected to a first terminal of said source, a voltage dropping resistance, a power winding wound upon a first of said core elements, a positive feedback winding wound upon a second of said core elements, and a first rectifier connected to a second terminal of said source, a second electrical circuit all elements of which are electrically connected in series arrangement with one another and which comprises a second rectifier connected to said second terminal, a positive feedback winding wound upon said first core, a power winding wound upon said second core, a voltage dropping resistance, and said load resistance connected to said first terminal of said source, a third electrical circuit all of the elements thereof being electrically connected in series relationship with one another and comprising a resistance one side of which is connected between said power winding which is wound upon said second core and said dropping resistance of said second circuit, a negative feedback winding upon said second core connected to the other side of said resistance of said third circuit, a negative feedback winding upon said first core, an inductance connected between said last named negative feedback winding and between the said dropping resistance of said first circuit and said power winding of said first circuit, and a fourth circuit connected to a source of direct current and comprising in series connection a control winding wound upon said first core and a control winding wound upon said second core and connected to said source of direct current.

4. A magnetic amplifier of the character disclosed comprising a plurality of magnetic core structures; a source of alternating current having a plurality of terminals; a first circuit electrically connected to said terminals of said source comprising in series conducting connection in the order named, a first power winding wound upon a first of said cores, a second power winding wound upon said second core, a first rectifier, a positive feedback winding wound upon the second of said core structures, a positive feedback winding wound upon a first of said core structures, a negative feedback winding wound upon the first of said core structures, a negative feedback winding wound upon the second of said core structures, a resistance, an inductance, and a second rectifier connected on the output side thereof to a load resistance connected to one of said terminals of said source; a resistance having one side thereof connected to the junction of the negative feedback winding of said first core with the positive feedback winding of said first core and having its other side connected to said second rectifier on the input side thereof; a third rectifier connected in series conducting relation between said last named resistance and said second power winding; and a fourth rectifier connected in series conducting relation between said load resistance and said second positive feedback winding; a second circuit having the elements thereof connected in series relationship with one another comprising a source of direct current, a control winding wound upon said first core, and a control winding wound upon said second core.

5. A magnetic amplifier circuit having improved response characteristics comprising a source of alternating current, a plurality of magnetic core structures, rectifying means connected in said circuit in such a manner that the current supplied by said alternating current source flows in a first path during one-half of the alternating current cycle and in a second path during the other half of said cycle, at least one positive feedback winding, one power winding, and two negative feedback windings respectively being wound in a predetermined selective manner in at least one of said paths whereby the rectified alternating current flowing in one of said paths flows through said windings in a predetermined sequence, at least one power winding and at least one positive feedback winding in said other path, an inductance in series connection with said negative feedback windings, and a direct current circuit comprising a source of direct current, a control winding serially connected to said source of direct current and wound upon one of said magnetic core structures, a second control winding serially connected to said first mentioned control winding and wound upon another magnetic core structure and connected to another terminal of said source of direct current.

6. In a magnetic amplifier having a high speed of unstable response stabilized by a delay negative feedback, a pair of magnetic core structures, each of said core structures having a power winding, a positive feedback winding, and a negative feedback winding wound thereon, electrical connections interconnecting said windings, a source of alternating current, rectifying means electrically connecting said source to said windings to pass current from said source through said windings, inductive means connected in series with said negative feedback windings for delaying the effect of said negative feedback windings, and a control circuit comprising a source of direct current and a control winding wound upon each of said magnetic core structures connected in series with one another and with said source of direct current.

7. A magnetic amplifier having high speed of response characteristics comprising a source of alternating current, four-terminal bridge rectifying means, a pair of magnetic core structures, a power circuit having a winding upon each of said core structures connected in series with said source across one pair of opposing terminals of said rectifying means, a second circuit comprising a positive feedback winding wound upon one of said core structures and a positive feedback winding wound upon the other of said core structures, electrical connections including a resistance connecting said positive feedback windings across the other pair of opposing terminals of said rectifying means, a third circuit comprising a negative feedback winding wound upon said one core structure and a negative feedback winding wound upon said other core structure with electrical connections connecting said negative feedback windings across said resistance, inductance means electrically connected to at least one of said negative feedback windings for delaying the effect of said negative feedback windings, and a control circuit comprising a source of direct current having two terminals, a control winding wound upon said other of said magnetic core structures electrically connected to one of said terminals of said source of direct current and to another control winding wound upon said one magnetic core structure, and said other control winding having the output side thereof electrically connected to said other terminal of said source of direct current.

8. A magnetic amplifier having a high speed of response characteristic without a sacrifice of stability and power amplification comprising, in combination, a plurality of magnetic core structures; a source of alternating current having a plurality of terminals; rectifying means electrically connected to one of said terminals; a first circuit comprising a power winding wound upon a first magnetic core structure, and a positive feedback winding wound upon a second magnetic core structure and connected in series with said power winding and said rectifying means; a second circuit comprising a positive feedback winding wound upon said first magnetic core structure and electrically connected to said rectifying means, and a power winding wound upon said second magnetic core structure and connected in series with said last named positive feedback winding; a load resistance electrically interconnecting said power windings to the other of said terminals; a negative feedback circuit electrically connected between said first circuit and said second circuit and comprising a first negative feedback winding wound upon said second magnetic core structure, a second negative feedback winding wound upon said first magnetic core structure and connected in series relationship with said first negative feedback winding, and an inductance connected in series with said negative feedback windings; and a control circuit comprising a source of direct current, a first control winding wound upon said first magnetic core structure and electrically connected to one terminal of said source of direct current, a second control winding wound upon said second magnetic core structure and connected in series with said first control winding and to another terminal of said source of direct current.

9. A magnetic amplifier of the character disclosed comprising a plurality of magnetic core structures, a source of alternating current, rectifying means in series connection through a load resistance with said source for passing current from said source, a plurality of power windings, positive feedback windings, negative feedback windings, said feedback windings being respectively wound upon said magnetic core structures and respectively interconnected with one another and electrically connected to said rectifying means for conducting current from and said source passed by said rectifying means, an inductance connected between at least one of said negative feedback windings and said source of alternating current in such a predetermined manner that upon energization of said power windings and said positive feedback windings from said source the amplifier is rendered inherently unstable which is characterized by jump response characteristics and after a predetermined time delay due to said inductance said negative feedback windings become effective to stabilize the circuit, a source of direct current, a control winding wound upon one of said magnetic core structures and in series connection with said source of direct current, another control winding wound upon another of said magnetic core structures and in series connection with said first control winding and having the output side thereof connected to said source of direct current.

10. A magnetic amplifier of the character disclosed comprising a source of alternating current, rectifying means connected in series relationship with said source for producing from said source a rectified energizing current for said amplifier, a plurality of magnetic core structures, power windings, positive feedback windings, negative feedback windings, and inductance means, said windings and said inductance means being electrically connected between said rectifying means and said source so as to be rendered conductive solely in response to said rectified current, said windings being operatively wound upon said magnetic core structures in such a manner that the positive feedback windings aid the power windings to establish a jump response characteristic and said inductance means delay the operation of said negative feedback windings until the establishment of said jump response characteristic.

11. A magnetic amplifier of the character disclosed comprising, in combination, a pair of cores, a source of alternating current energizing potential, rectifying means connected to provide from said source a rectified energizing current, a control signal source, an input circuit including a pair of control windings wound respectively on said cores and connected to be energized from said control signal source, an output circuit including a pair of power windings wound respectively on said cores and connected to conduct solely said rectified current, a positive feedback loop including a pair of positive feedback windings wound respectively on said cores and electrically connected to said power windings so as to conduct solely said rectified current in a manner to produce jump response characteristics in said output circuit in response to the application from said control signal source of a control signal to said input circuit, a negative feedback loop including a pair of negative feedback windings wound respectively on said cores and electrically connected to said power windings so as to conduct solely said rectified current in a manner to oppose said jump characteristics, and means in said negative feedback loop for causing time delayed operation thereof at a predetermined rate.

12. In a magnetic amplifier having improved time of response characteristics and including a two terminal source of alternating current and first and second magnetic cores, the combination comprising, a first closed path connected across said two terminals and conductively responsive to the positive half cycle of said alternating current source, said first path including a series arrangement in the order named of a load, a power winding wound on said first core, a positive feedback winding wound on said second core, and a unidirectional conductive device; and a second closed path connected across said two terminals and conductively responsive to the negative half cycle of said alternating current source, said second path including a series arrangement in the order named of a load, a power winding wound on said second core, a positive feedback winding wound on said first core, and a unidirectional conductive device.

13. In the magnetic amplifier as defined in claim 12, further including a pair of serially connected negative feedback windings interconnecting said power windings, one of said negative feedback windings being wound on said first core and the other of said negative feedback windings being wound on said second core.

14. A magnetic amplifier having rapid response characteristics comprising, in combination, a plurality of saturable core reactors; a control winding wound on each of said reactors; a control circuit including a control signal source for applying a control signal to said control windings; an alternating current source; a load; a power winding wound on each of said reactors; a positive feedback winding and a negative feedback winding wound on each of said reactors; a rectifier arrangement including first and second rectifying means; and a plural path conductive circuit including in interconnected circuit relation said alternating current source, said load, said rectifying arrangement, said power windings, said positive feedback windings, and said negative feedback windings whereby said conductive circuit passes solely current from said alternating current source; said first rectifying means being so poled as to pass current from said alternating current source in one direction through said load, and said second rectifying means being so poled as to pass current from said alternating current source in a reverse direction through said load whereby a signal correlative to the applied control signal appears across said load under influence of the rapid response provided by said positive and negative feedback windings.

15. In a magnetic amplifier having a plurality of cores of saturable magnetic material each having wound thereupon control windings to which are applied control signals from a control signal source, the combination comprising, a power winding on each of said cores; a positive feedback winding on each of said cores; a negative feedback winding on each of said cores; a source of alternating current; a load; a voltage dropping resistance; a first consumption circuit including in series connection said load, said alternating current source, and all of said power windings; a second consumption circuit including in series connection all of said positive feedback windings, and said voltage dropping resistance; first electric valve means serially interconnecting said first and second consumption circuits to define a closed series path for passing current from said alternating current source in one direction through said first and second consumption circuits; second electric valve means serially interconnecting said first and second consumption circuits to define another closed series path for passing current from said alternating current source in the reverse direction through said first and second consumption circuits; and circuit connections for connecting all of said negative feedback windings in series across said voltage dropping resistance.

References Cited in the file of this patent

UNITED STATES PATENTS 2,561,329 Ahlen ---------------- July 24, 1951

OTHER REFERENCES

Publication entitled "Magnetic Amplifiers of the Balanced Detector Type," by W. A. Geyger, published by A. I. E. E. as a miscellaneous paper December 1949. Copy in Div. 26.

Publication entitled "A Theoretical and Experimental Study of the Series Connected Magnetic Amplifier," by H. M. Gale and P. D. Atkinson, published by the Institution of Electrical Engineers, vol. 96, part I, March 1949. Copy in Div. 26.